(12) United States Patent
Hansen

(10) Patent No.: US 8,352,490 B2
(45) Date of Patent: Jan. 8, 2013

(54) METHOD AND SYSTEM FOR LOCATING UPDATE OPERATIONS IN A VIRTUAL MACHINE DISK IMAGE

(75) Inventor: Jacob Gorm Hansen, Ryomgaard (DK)

(73) Assignee: VMware, Inc., Palo Alto, CA (US)

( * ) Notice: Subject to any disclaimer, the term of this patent is extended or adjusted under 35 U.S.C. 154(b) by 476 days.

(21) Appl. No.: 12/604,334

(22) Filed: Oct. 22, 2009

(65) Prior Publication Data

US 2011/0099187 A1 Apr. 28, 2011

(51) Int. Cl.
*G06F 7/00* (2006.01)
*G06F 17/30* (2006.01)

(52) U.S. Cl. .................. 707/769; 707/812; 707/823

(58) Field of Classification Search .................. None
See application file for complete search history.

(56) References Cited

U.S. PATENT DOCUMENTS

| | | | |
|---|---|---|---|
| 6,058,493 A | 5/2000 | Talley | |
| 6,192,472 B1 | 2/2001 | Garay et al. | |
| 7,069,452 B1 | 6/2006 | Hind et al. | |
| 7,320,076 B2 | 1/2008 | Caronni | |
| 7,426,566 B2 | 9/2008 | Godwin et al. | |
| 7,519,721 B2 | 4/2009 | Godwin et al. | |
| 7,548,915 B2 * | 6/2009 | Ramer et al. ............... | 705/14.54 |
| 7,548,928 B1 * | 6/2009 | Dean et al. .............. | 1/1 |
| 7,685,095 B2 * | 3/2010 | Ghosh et al. .......... | 707/999.002 |
| 7,873,168 B2 | 1/2011 | Tateoka et al. | |
| 7,916,871 B2 | 3/2011 | Brookner et al. | |
| 2002/0059329 A1 | 5/2002 | Hirashima | |
| 2002/0133608 A1 | 9/2002 | Godwin et al. | |
| 2002/0165902 A1 | 11/2002 | Robb et al. | |
| 2004/0098425 A1 | 5/2004 | Wiss et al. | |
| 2004/0175000 A1 | 9/2004 | Caronni | |
| 2006/0136713 A1 | 6/2006 | Zimmer et al. | |
| 2007/0094659 A1 | 4/2007 | Singh et al. | |
| 2007/0220605 A1 | 9/2007 | Chien | |

(Continued)

OTHER PUBLICATIONS

Notification of Transmittal of the International Search Report and the Written Opinion of the International Searching Authority, or the Declaration, Mar. 2, 2011, Patent Cooperation Treaty "PCT", KIPO, Republic of Korea.

(Continued)

*Primary Examiner* — Loan T Nguyen
(74) *Attorney, Agent, or Firm* — Daniel Lin

(57) ABSTRACT

A two dimensional bit array is maintained to keep track of the location of data records in a log file that is organized as a plurality of log segments, each comprising a plurality of data records. The data records are indexed in the log file according to randomized unique ids. Each column of the two dimensional bit array represents a Bloom filter corresponding to a log segment of the log file such that, given a particular randomized unique id, log segments that may contain the data record corresponding to the particular randomized unique id can be efficiently identified by utilizing Bloom filter techniques to analyze the columns of the two dimensional bit array.

18 Claims, 11 Drawing Sheets

U.S. PATENT DOCUMENTS

| | | |
|---|---|---|
| 2008/0095375 A1 | 4/2008 | Tateoka et al. |
| 2008/0189428 A1 | 8/2008 | Godwin et al. |
| 2008/0235765 A1* | 9/2008 | Shimizu ............................ 726/2 |
| 2009/0245518 A1 | 10/2009 | Bae et al. |
| 2010/0050249 A1 | 2/2010 | Newman |
| 2010/0107158 A1 | 4/2010 | Chen et al. |
| 2010/0175061 A1 | 7/2010 | Maeda et al. |
| 2010/0189014 A1 | 7/2010 | Hogan |
| 2011/0022574 A1 | 1/2011 | Hansen |
| 2011/0022883 A1 | 1/2011 | Hansen |
| 2011/0145188 A1* | 6/2011 | Vachuska ...................... 707/610 |

OTHER PUBLICATIONS

Moni Naor et al., "Access Control and Signatures via Quorum Secret Sharing." Parallel and Distributed Systems, IEEE Transactions, 9(9):909-922 Sep. 1998.

Hakim Weatherspoon et al., "Antiquity: Exploiting a Secure Log for Wide-Area Distributed Storage." EuroSys '07: Proceedings of the 2007 Conference on EuroSys, pp. 371-384, New York, NY 2007. ACM Press.

\* cited by examiner

METHOD AND SYSTEM FOR LOCATING UPDATE OPERATIONS IN A VIRTUAL MACHINE DISK IMAGE

CROSS-REFERENCE TO RELATED APPLICATIONS

This application is related to U.S. patent application Ser. No. 12/506,965, entitled "System and Method for Replicating Disk Images in a Cloud Computing Based Virtual Machine File System", filed on Jul. 21, 2009; and U.S. patent application Ser. No. 12/507,013, entitled "Method for Voting with Secret Shares in a Distributed System", filed on Jul. 21, 2009, both of which are hereby incorporated by reference (collectively, referred to herein as the "Related Applications").

BACKGROUND OF THE INVENTION

Current enterprise level virtual machine file systems, such as VMware Inc's VMFS, are typically shared disk file systems that utilize an external storage device, such as a storage area network (SAN), to provide storage resources to virtual machines. These virtual machines are instantiated and run on one or more servers (sometimes configured as a server cluster) that store their virtual machines' disk images as separate files in the SAN. Each server in the cluster runs a virtualization layer (sometimes referred to as a hypervisor) that includes an implementation of a virtual machine file system that coordinates the interaction of the server with the SAN. For example, each virtual machine file system on each server in a cluster implements and follows a common per-file locking protocol that enables virtual machines running on multiple servers to simultaneously access (e.g., read and write) their disk images in the SAN without fear that other servers may simultaneously access the same disk image at the same time.

FIG. 1 depicts one example of a network architecture for a cluster of virtualization servers utilizing a SAN. Each virtualization server $100_A$ to $100_J$ is networked to SAN 105 and communicates with SAN 105 using SCSI-based protocols. As previously discussed, each virtualization server $100_A$ to $100_J$ includes a hypervisor, such as $110_A$, that includes a virtual machine file system, such as $115_A$. Hypervisor $110_A$ provides virtualization support to enable its server $100_A$ to instantiate a number of virtual machines, such as $120_A$ through $125_A$. The disk images for each of virtual machines $120_A$ through $125_A$ are stored in SAN 105.

The network architecture of FIG. 1 provides protection against server failures because SAN 105 serves as a central storage resource that stores disk images for virtual machines of all the servers in the cluster. For example, if server $100_A$ experiences a hardware failure, any of the other servers in the cluster can "failover" any of virtual machines $120_A$ through $125_A$ by instantiating a new virtual machine and associating the newly created virtual machine with the failed virtual machine's disk image stored in SAN 105 (i.e., provided such server has sufficient computing resources to support the virtual machine). However, SAN 105 itself becomes a potential bottleneck and a single point of failure.

Proposed virtual machine file systems, such as those described in the Related Applications, employ a replicated and decentralized storage system. In such systems, as in warehouse-style or "cloud" computing systems, multiple networked servers utilize cheaper local storage resources (such as SATA disks) rather than a centralized SAN, even though they may be less reliable. Such replicated and decentralized storage systems eliminate the bottleneck and single point of failure that are problematic with a SAN. As further detailed in the Related Applications, such proposed virtual machine file systems employ data replication techniques that provide high availability and ensure the integrity and consistency of replicated data. What is needed, however, in such replicated and decentralized storage systems, as a way to efficiently recover from server failures, is a way to locate specified data in a virtual machine's disk image (e.g., for replication purposes, etc) without requiring significant I/O resources to search for such data.

SUMMARY OF THE INVENTION

One or more embodiments of the invention utilize Bloom filter data structures stored in the memory of virtual machine servers to keep track of the location of specified data in a locally stored virtual machine disk image without having to access local storage to obtain such location information. A method, according to one embodiment of the present invention, locates a data record in a log file that is organized as a plurality of log segments, wherein each log segment comprises a plurality of data records and data records are indexed in the log file according to randomized unique ids. For example, in one embodiment, the log file may be a virtual machine disk image stored in the local storage of a virtual machine server and the data record may be an update operation that corresponds to a write operation of the virtual machine corresponding to the disk image.

Such a method comprises receiving a randomized unique id associated with the data record, generating a plurality of Bloom filter hash values from the randomized unique id, extracting a plurality of rows that correspond to the plurality of hash values from a two dimensional bit array, wherein each of the columns of the two dimensional bit array represents a Bloom filter corresponding to a log segment of the log file, calculating, for each of the columns in the two dimensional bit array, an intersection of the bit values in the column across the plurality of rows, and searching a log segment of the log file for the data record associated with the randomized unique id, wherein the log segment corresponds to a column in the two dimensional bit array whose calculated intersection is a set bit.

DETAILED DESCRIPTION

Figure 1:
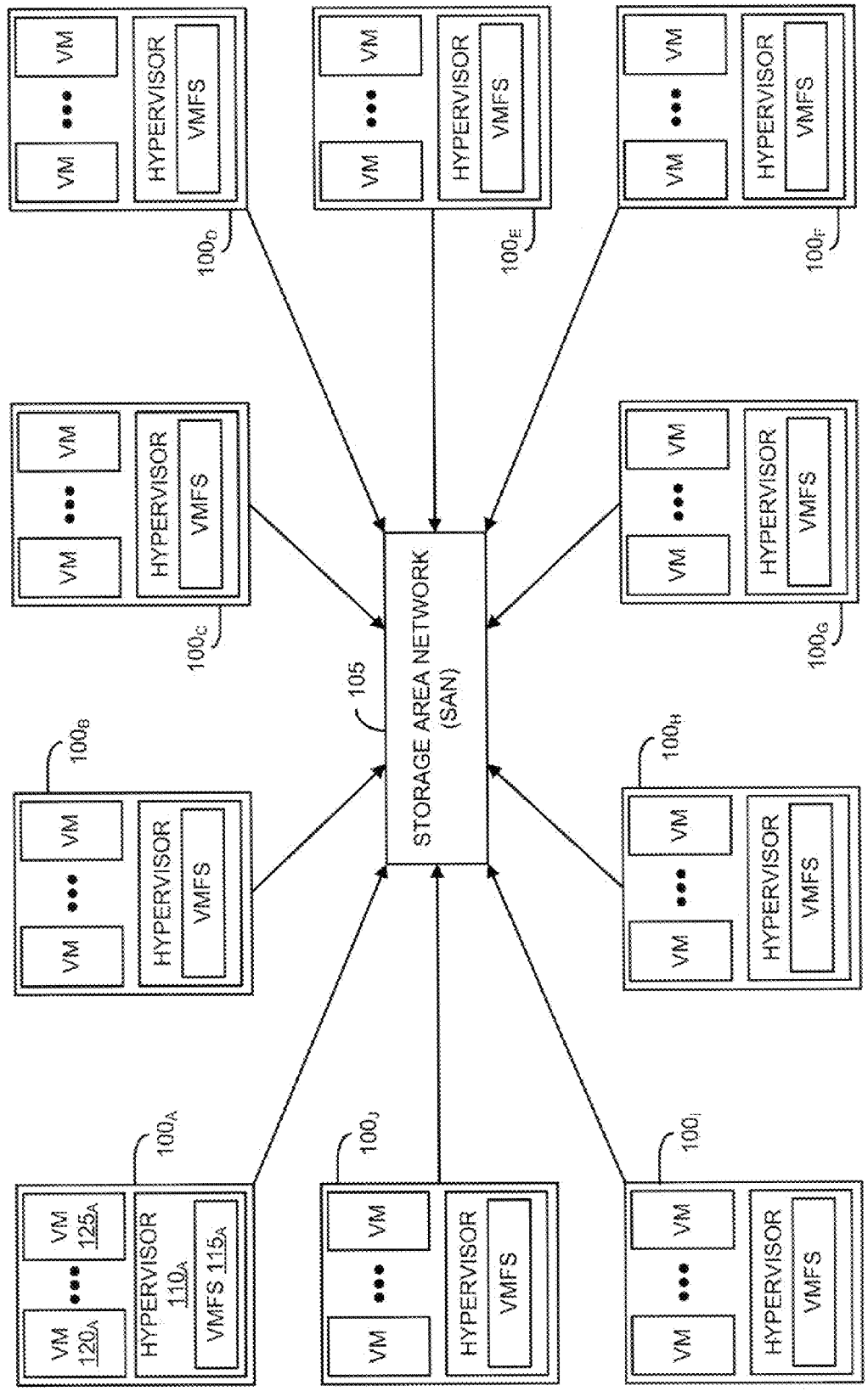
FIG. 1 depicts a network architecture for a cluster of virtualization servers utilizing a SAN.
Figure 2:
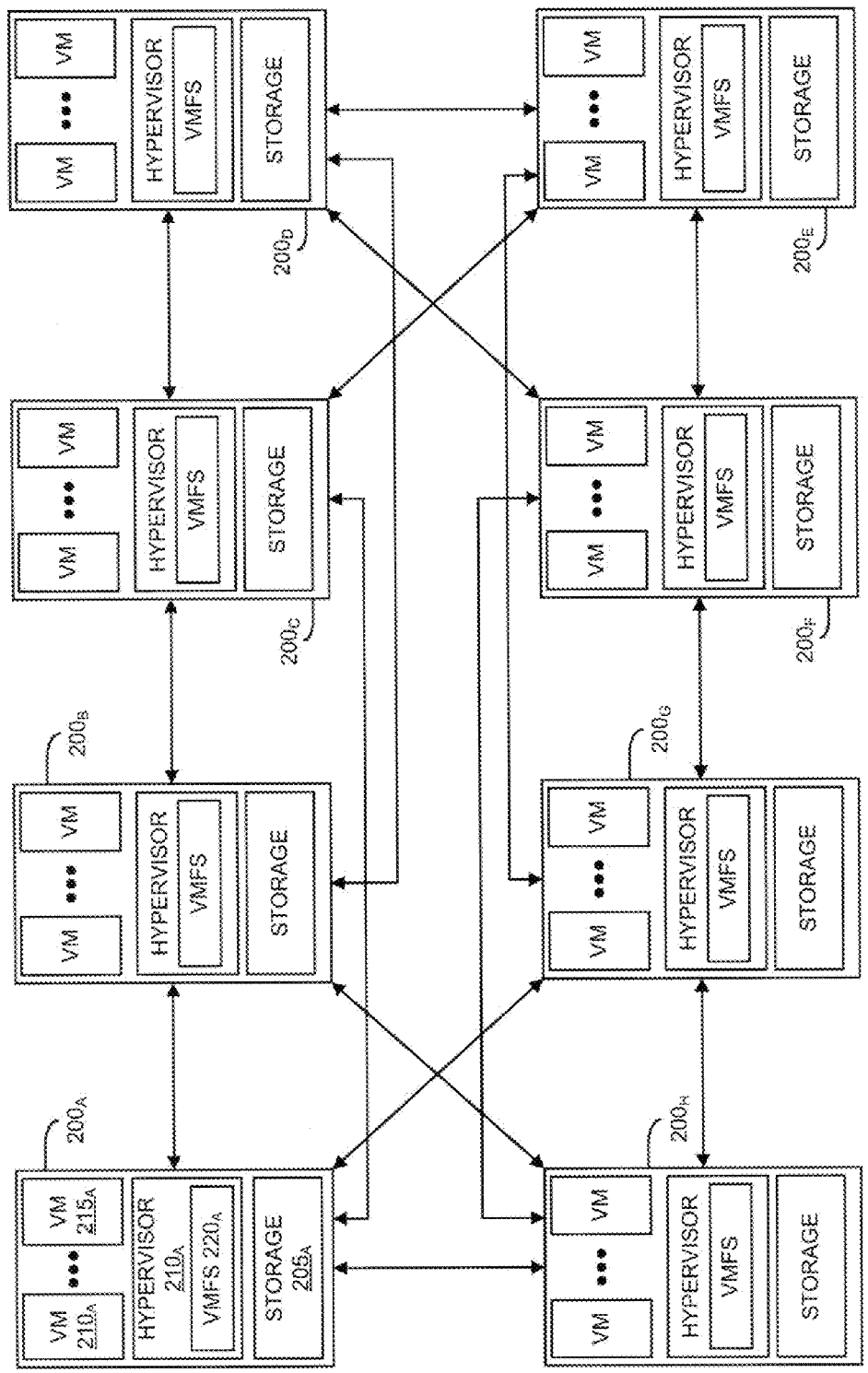
FIG. 2 depicts a network architecture using a replicated and decentralized storage system for a virtual machine file system, in which one or more embodiments of the present invention may be utilized.

FIG. 2 depicts a network architecture using a replicated and decentralized storage system for a virtual machine file system, in which one or more embodiments of the present invention may be utilized. In contrast to the network architecture of FIG. 1, in which virtualization servers communicate with a centralized SAN to access stored disk images corresponding to their respective instantiated virtual machines, each of the virtualization servers $200_A$ to $200_H$ in the cluster of FIG. 2 has its own directly attached local storage, such as local storage $205_A$ for virtualization server $200_A$. As such, virtual machines $210_A$ to $215_A$ running on server $200_A$ store their disk images in local storage $205_A$. Storage in such a network architecture can therefore be considered "decentralized" because disk image data (in the aggregate) is stored across the various local storages residing in the servers. Each of virtualization servers $200_A$ to $200_H$ includes a hypervisor such as $210_A$ that supports the instantiation and running of virtual machines on the server. Hypervisor $210_A$ further includes a virtual machine file system $220_A$ that coordinates and manages access to local storage $205_A$ by virtual machines $210_A$ to $215_A$ (i.e., to read from or write to their respective disk images).

Each of servers $200_A$ to $200_H$ is further networked to one or more of the other servers in the cluster. For example, server $200_A$ is networked to server $200_B$, server $200_C$, server $200_G$, and server $200_H$. As depicted in the network topology of FIG. 2, each server is networked to four other servers in the cluster and can reach another server in no more than one hop. It should be recognized, however, that the network topology of FIG. 2 is a simplified illustration for exemplary purposes and that any network topology that enables communication among the servers in a cluster can be used consistent with the teachings herein, including, without limitation, any ring, mesh, star, tree, point-to-point, peer-to-peer or any other network topology, whether partially connecting or fully connecting the servers. By removing a centralized SAN from the network architecture, embodiments of the present invention remove a potential bottleneck and single point of failure in the architecture and are more easily able to scale storage for a virtualized data center in a cost efficient manner by incrementally adding servers utilizing local storage to the cluster.

Figure 3:
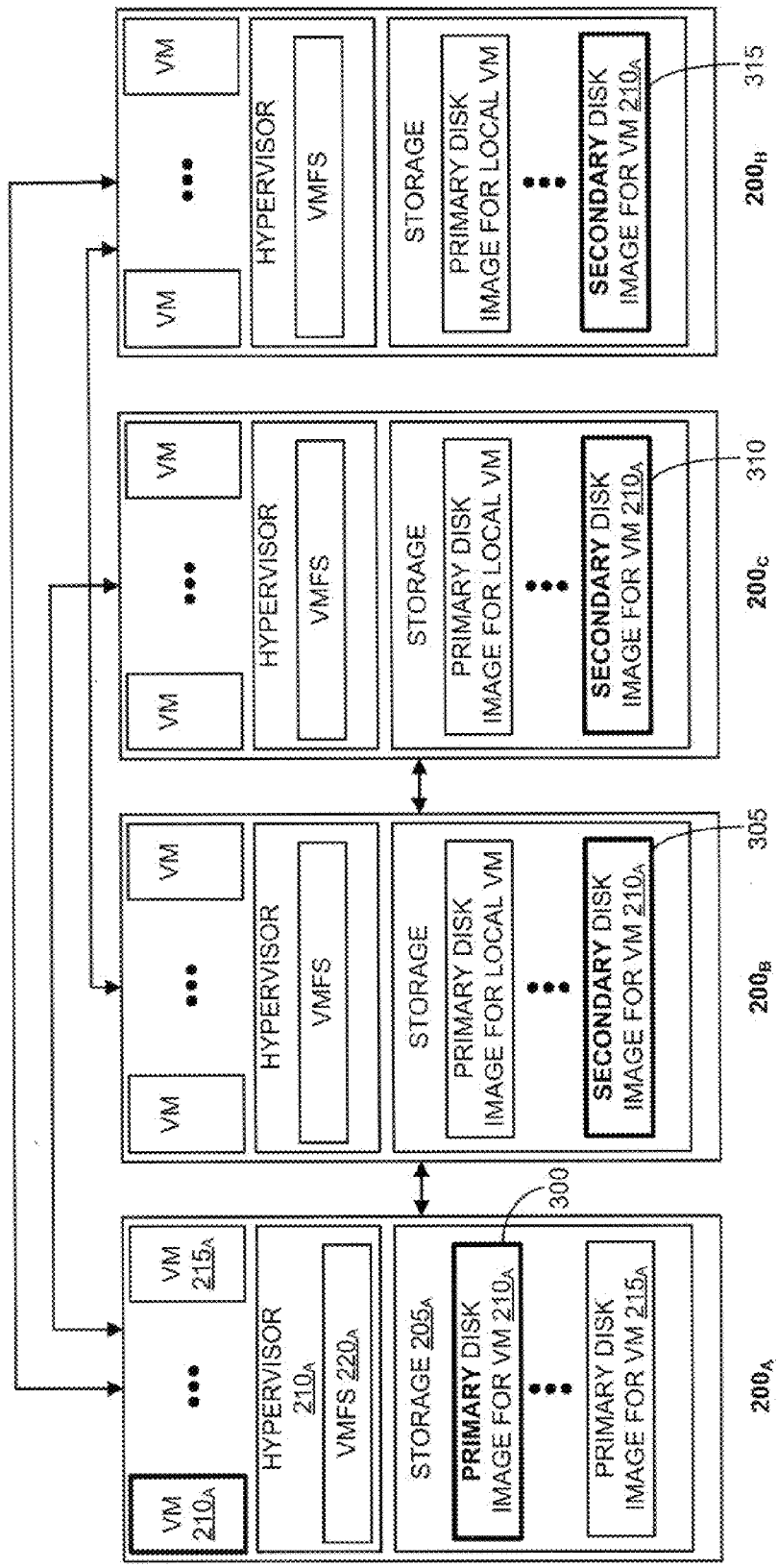
FIG. 3 depicts disk image replication for a virtual machine running on a server in a network architecture using a replicated and decentralized storage system.

According to the present invention, virtual machine file systems that utilize a network architecture similar to that of FIG. 2 can replicate disk images across the local storages of servers in a cluster to provide server failure protection. If a server fails, another server in the cluster that has a locally stored replica of the disk image of a virtual machine in the failed server can "failover" that particular virtual machine. In one embodiment, a designated server in the cluster has responsibilities as a replication manager and may, for example, instruct server $200_A$ to replicate the disk image for virtual machine $210_A$ to the local storages of servers $200_B$, $200_C$, and $200_H$. As referred to herein, a server that is running a virtual machine is the "primary server" with respect to the virtual machine, and other servers that store replications of the virtual machine's disk image for failover purposes are "secondary servers." Similarly, a copy of the disk image of a virtual machine that is stored in the local storage of the primary server is a "primary" copy, replica or disk image, and a copy of the disk image of a virtual machine that is stored in the local storage of a secondary server is a "secondary" copy, replica or disk image. FIG. 3 depicts disk image replication for a virtual machine running on a server in a network architecture using a replicated and decentralized storage system. In particular, virtual machine $210_A$ running on primary server $200_A$ utilizes a primary disk image 300 stored on local storage $205_A$ of server $200_A$ during normal operations. Primary disk image 300 is replicated as secondary disk images 305, 310 and 315, respectively, in the local storages of secondary servers $200_B$, $200_C$, and $200_H$.

Figure 4A:
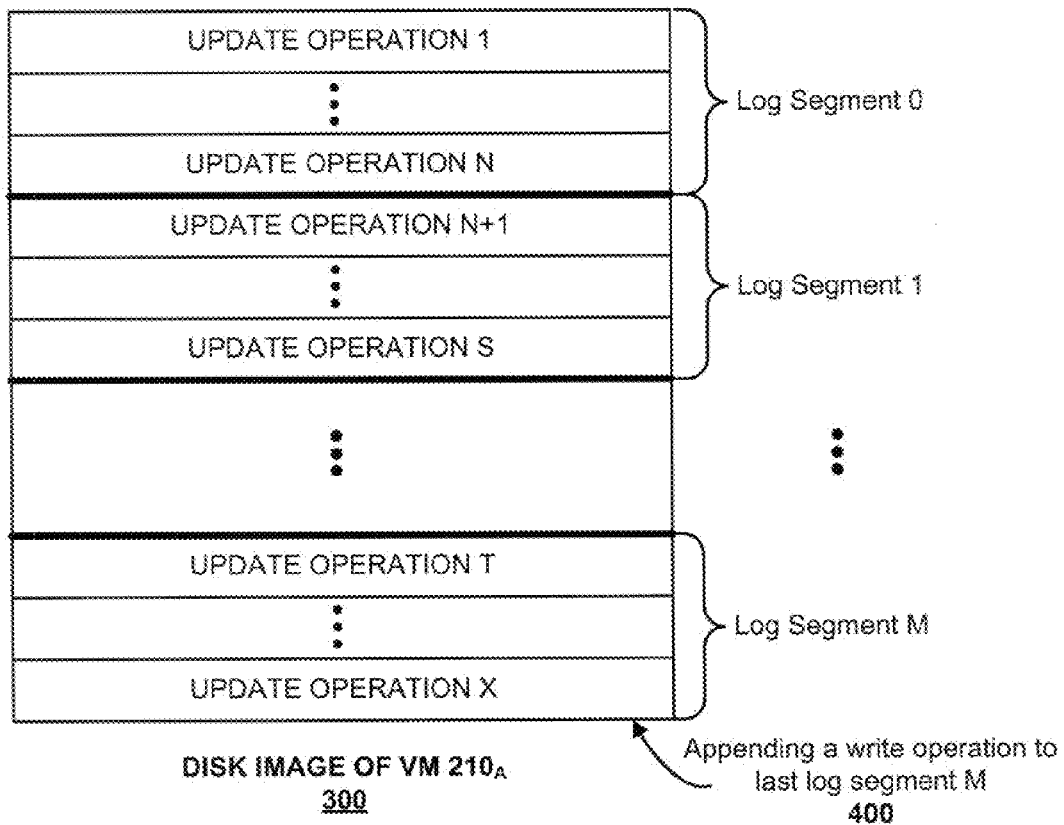
FIG. 4A depicts a log structure of a disk image of a virtual machine stored on local storage, according to one or more embodiments of the present invention.

FIG. 4A depicts a log structure of a disk image of a virtual machine stored on local storage, according to one or more embodiments of the present invention. As illustrated in FIG. 4A, disk image 300 for virtual machine $210_A$ running on server $200_A$ is structured as a temporally ordered log of update operations made to the disk. Disk image 300 is subdivided into a number of log segments, which each contains a number of update operations. In one embodiment, for example, each log segment is 16 MBs and can contain thousands of update operations. When virtual machine $210_A$ issues a write operation (e.g., containing a logical block address from the virtual address space of the virtual machine and data to be written into the logical block address) to its disk, virtual machine file system $220_A$ receives the write operation and generates a corresponding update operation, such as update operation 400, and appends update operation 400 to the end of the current log segment of disk image 300 (e.g., as update operation X in FIG. 4A). As described in the Related Applications, a B-tree or other similar tree or search data structure may be used to enable virtual machine file system $220_A$ to handle read operations issued by virtual machine $210_A$.

Figure 4B:
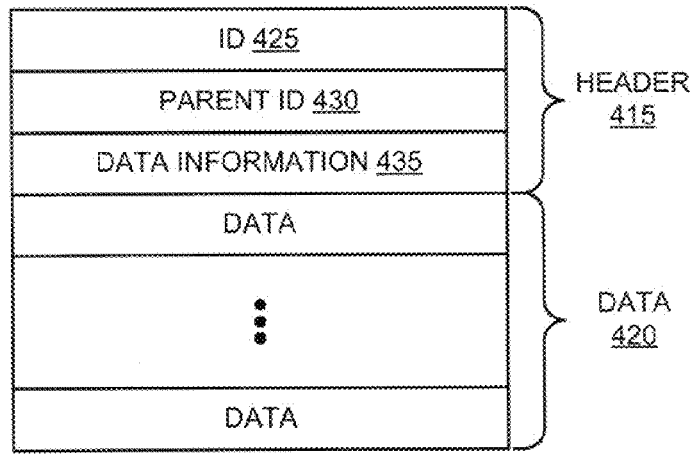
FIG. 4B depicts an internal data structure of an update operation of a disk image, according to one or more embodiments of the present invention.

FIG. 4B depicts an internal data structure of an update operation of a disk image, according to one or more embodiments of the present invention. An update operation stored in disk image 300, such as update operation 410 in FIG. 4B, contains a header portion 415 and data portion 420. Header portion 415 includes an id entry 425 that stores a unique identification or id for the update operation, a "parent" id entry 430 that stores a unique id of the preceding update operation stored in the log of disk image 300, and data information entry 435 that stores descriptive information about data portion 420 (e.g., amount of data, address locations, etc.). In one embodiment, as further detailed in the Related Applications, id entry 425 is a 160 bit value generated through the use of a cryptographic one way hash function such as SHA-1 or SHA-256. As further described in the Related Applications, id entry 425 may be generated or determined based on the data from the update operation, such as by combining the data from the update operation with a parent id relating to the preceding update operation and a master secret token. Because such id entries are generated using a hash function, they are pseudo-random values and have no locality information with regards to id entries for prior or subsequent update operations (i.e., given a particular id entry, one cannot determine an id entry for any prior or subsequent update operations). Due to this lack of locality information, traditional data structures that leverage such locality information to reduce I/O operations needed to find update operations within a disk image are thus unsuitable.

Due to the pseudo-random nature of the id entries for update operations, one or more embodiments of the present invention maintains a Bloom filter or other similar data structure for each log segment of a disk image to assist in determining whether an update operation having a particular id entry value may be found in such a log segment. As should be recognized, a Bloom filter is a known probabilistic data structure used to test whether an element is a member of a set. While Bloom filters may provide false positives (i.e., indicating an element is a member of a set when it is not), they do not provide false negatives (i.e., indicating an element is not a member of a set when it is). Given a particular id entry of an update operation, a Bloom filter for a particular log segment indicates whether the update operation may be stored in the log segment.

Figure 5:
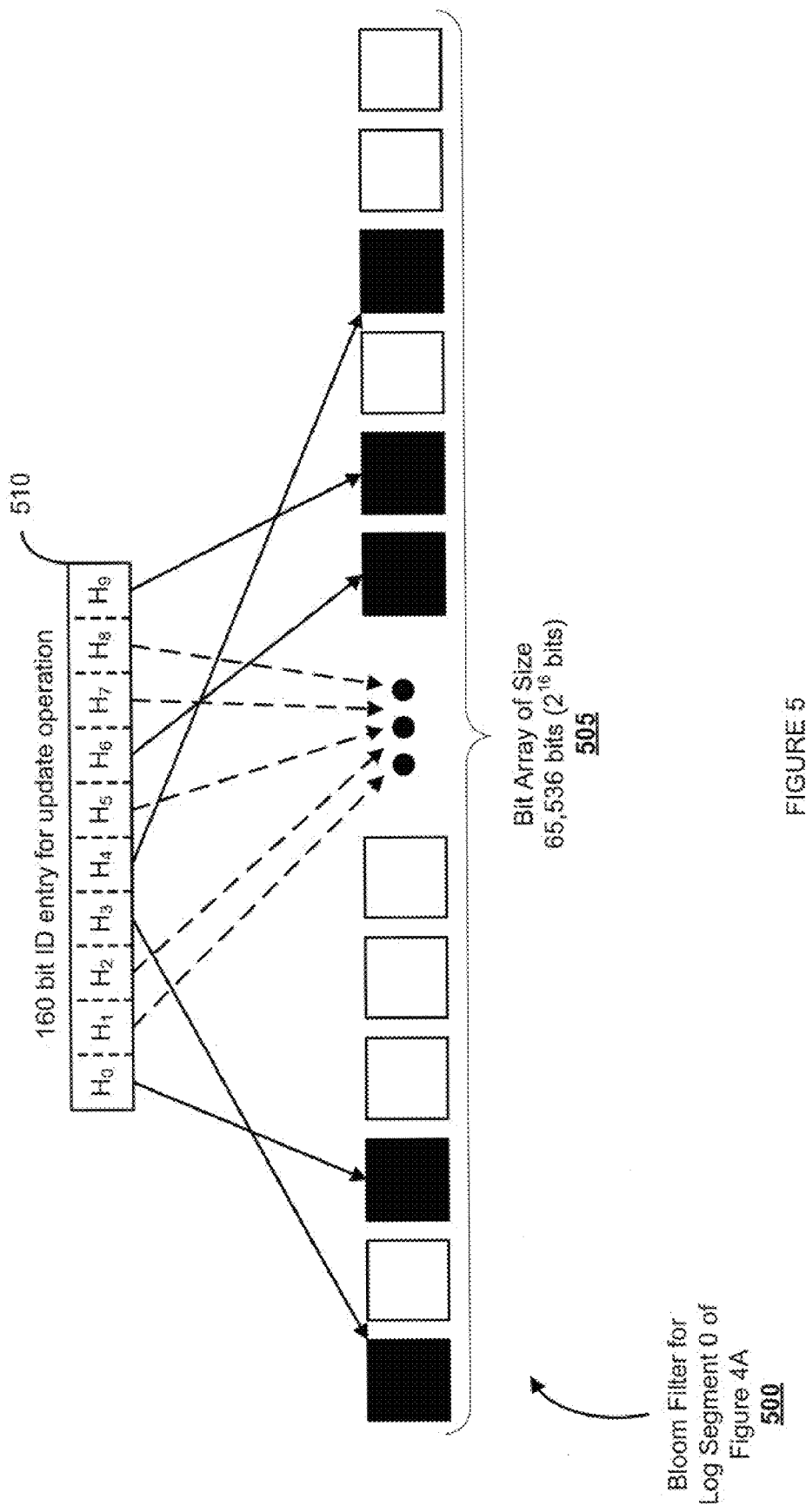
FIG. 5 depicts a Bloom filter for a log segment of a disk image, according to one or more embodiments of the present invention.

FIG. 5 depicts a Bloom filter for a log segment of a disk image, according to one or more embodiments of the present invention. As illustrated in FIG. 5, Bloom filter 500 for log segment 0 of disk image 300 in FIG. 4A is a bit array 505 of 65,536 bits (i.e., a $2^{16}$ bit array), although it should be recognized that any bit array size may be utilized consistent with the teachings herein. Bloom filter 500 utilizes ten different pseudo-random values 510 (also referred to herein as "hash values"), each of which maps to one of the bit positions in bit array 505. It should also be recognized, however, that any number of hash values may be utilized consistent with the teachings herein. Given a particular id entry (which, as previously discussed, is a result of a hash function), each of these ten different hash values 510 generates a bit position in array 500 with a uniform random distribution. In the embodiment of FIG. 5, the ten different hash values 510 are simply 16 bit contiguous portions of the 160 bit id entry of an update operation that is either being added to the log segment or being queried for its existence in the log segment. Because, as discussed in the context of FIG. 4B, the 160 bit id entry is a pseudo-random number generated by a cryptographic one way hash function such as SHA-1 or SHA-256, each 16 bit portion of the id entry, itself, has a random distribution such that the correspondence of 16 bit portions of the id entry to bit positions in $2^{16}$ bit sized array 500 is also uniformly and randomly distributed. However, although FIG. 5 depicts the ten hash values as each being equal to a contiguous 16 bit portion of the 160 bit id entry, it should be recognized that any method of extracting any distinct group of 16 bits from the 160 bit id entry for each hash value may be utilized, regardless of whether such bits are contiguous.

Figure 6:
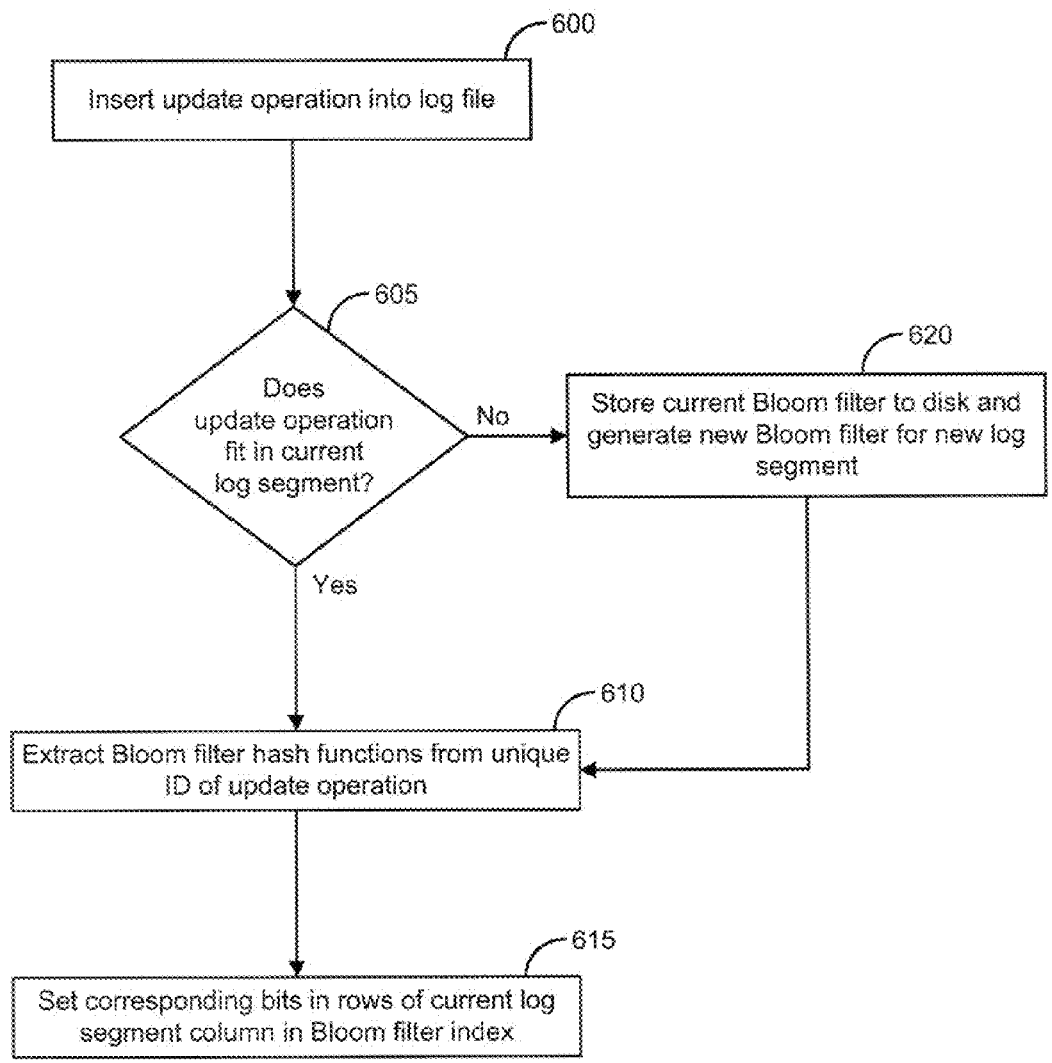
FIG. 6 depicts a flow chart for adding an update operation into a log segment of a disk image using a Bloom filter, according to one or more embodiments of the present invention.

FIG. 6 depicts a flow chart for adding an update operation into a log segment of a disk image using a Bloom filter that may be stored in memory, according to one or more embodiments of the present invention. While the following descriptions of the steps of the flow chart may reference structures of FIGS. 2, 3, 4A, and 4B, it should be recognized that any other network architectures, virtualization servers, disk image formats and update operation structures that are consistent with the teachings herein may be used in conjunction with the flow chart of FIG. 6. In step 600, virtual machine file system $220_A$ generates an update operation with, for example, a unique 160 bit id entry corresponding to a write operation issued by virtual machine $210_A$ and appends the update operation to the end of disk image 300. If, in step 605, virtual machine file system $220_A$ is able to append the update operation within the current log segment, then in step 610, virtual machine file system $220_A$ generates the ten hash values for the Bloom filter from the 160 bit id entry of the update operation by, for example, taking a contiguous 16 bit portion of the 160 bit id entry for each of the ten hash values, as described in FIG. 5. In step 615, virtual machine file system $220_A$ sets each bit position of the current log segment's Bloom filter corresponding to each of the ten hash values. If, however, in step 605, the appended update operation results in the start of a new log segment (i.e., current log segment was full), then virtual machine file system $220_A$ stores the current Bloom filter to local storage and generates a new Bloom filter in memory, for example, for the new log segment in step 620 prior to proceeding to step 610.

Figure 7:
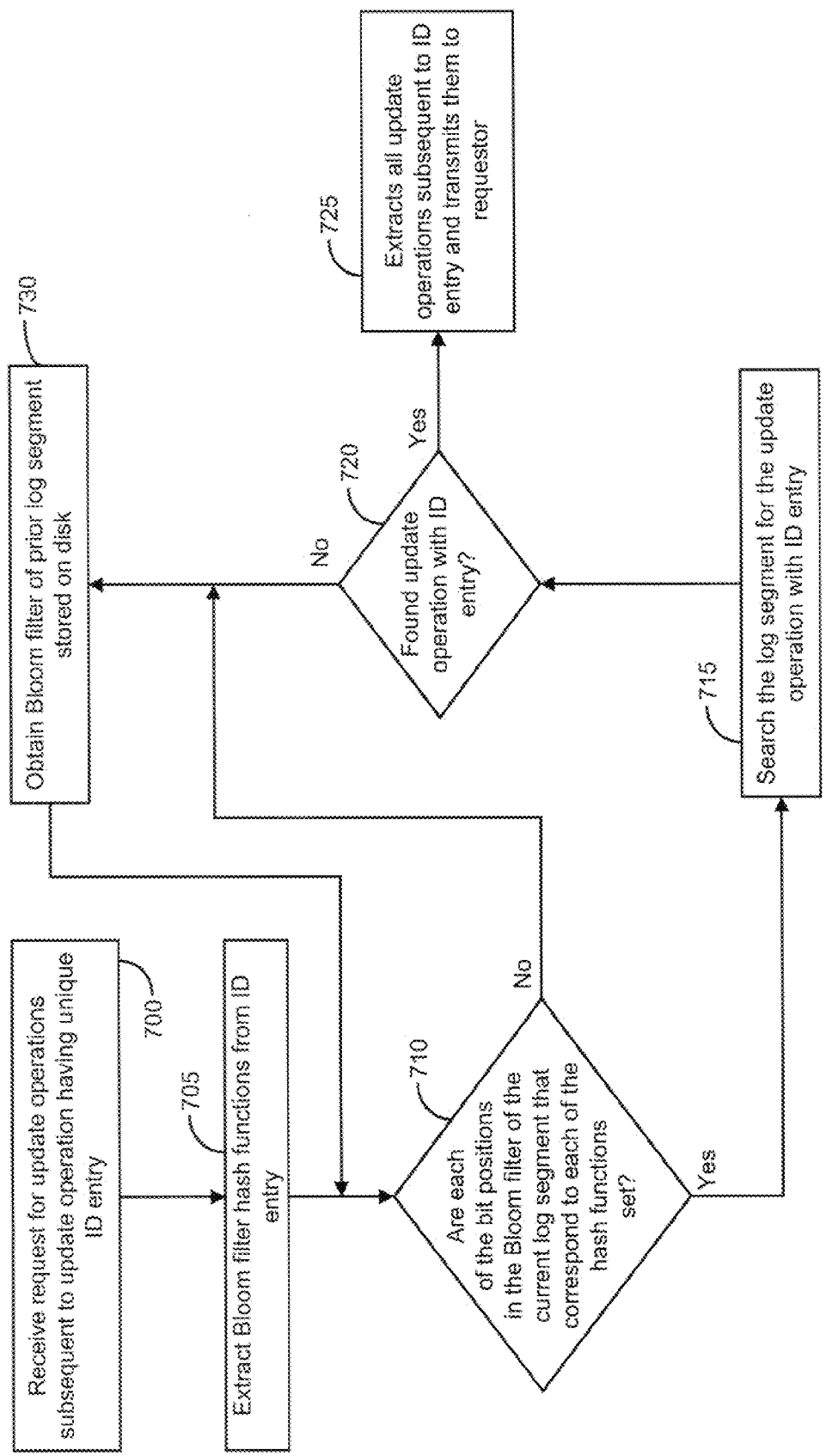
FIG. 7 depicts a flow chart for determining whether an update operation may be in a log segment of a disk image using a Bloom filter, according to one or more embodiments of the present invention.

FIG. 7 depicts a flow chart for determining whether an update operation may be in a log segment of a disk image using a Bloom filter, according to one or more embodiments of the present invention. Such a determination may be needed, for example, when a secondary server loses its network connection, is subsequently reconnected to the network, and requests all update operations to its replica disk image from the primary server since its network connection loss. While the following descriptions of the steps of the flow chart may reference structures of FIGS. 2, 3, 4A, and 4B, it should be recognized that any other network architectures, virtualization servers, disk image formats and update operation structures that are consistent with the teachings herein may be used in conjunction with the flow chart of FIG. 7. In step 700, virtual machine file system $220_A$ receives a request from a secondary server for all update operations occurring since the last update operation stored in its secondary disk image, having a unique 160 bit id entry. In step 705, virtual machine file system $220_A$ extracts the Bloom filter hash values from the received unique id entry (e.g., generating ten 16 bit portions from the 160 bit unique id entry, etc.). If, in step 710, each of the hash values corresponds to a bit position in the current log segment's Bloom filter that has been set, then in step 715, virtual machine file system $220_A$ searches the current log segment for the update operation. If, in step 720, the update operation is found in the log segment, then, in step 725, virtual machine file system $220_A$ extracts all update operations subsequent to the found update operation and transmits them to the secondary server. However, if in step 720, the update operation is not found in the log segment, then in step 730, virtual machine file system $220_A$ obtains the Bloom filter for the prior log segment that is stored on local storage and proceeds to step 710 to determine whether the update operation may be in such log segment. Also, if in step 710, each of the hash values does not correspond to a bit position in the current log segment's Bloom filter that has been set, then in step 730, virtual machine file system $220_A$ obtains the Bloom filter for the prior log segment that is stored on local storage and proceeds to step 710 to determine whether the update operation may be in such log segment.

Figure 8:
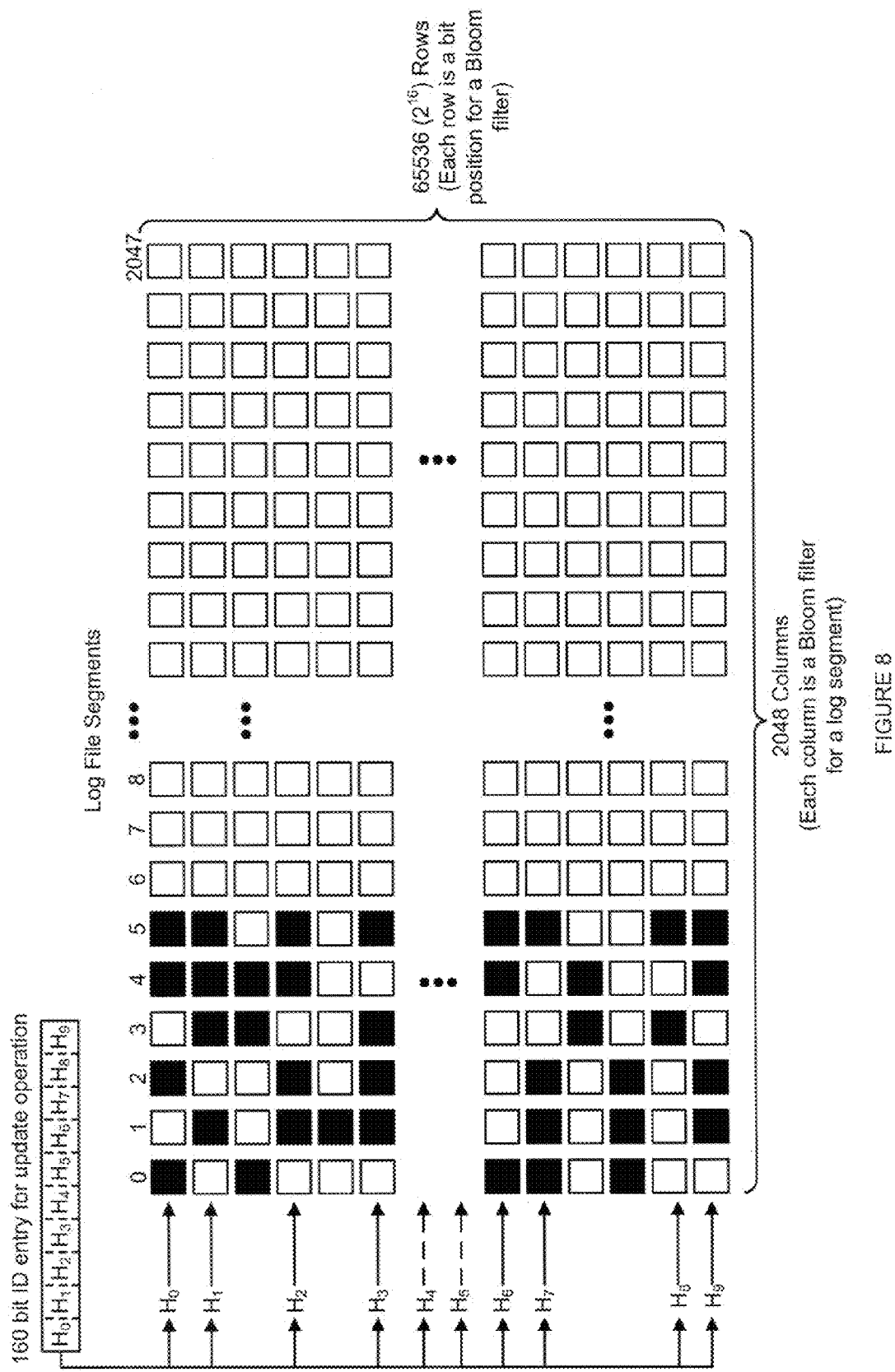
FIG. 8 depicts a Bloom filter matrix data structure, according to one or more embodiments of the present invention.

In one or more embodiments of the present invention, virtual machine file systems maintain a Bloom filter matrix data structure in memory to reduce the amount of accesses to local storage (e.g., as required in step 730 of FIG. 7) needed to determine whether an update operation may be stored in a particular log segment. FIG. 8 depicts a Bloom filter matrix data structure, according to one or more embodiments of the present invention. The Bloom filter matrix data structure of FIG. 8 is a 2 dimensional bit array, in which each column, from left to right, represents a Bloom filter for a consecutive log segment in a disk image. As depicted in FIG. 8, update operations are currently being stored into log segment 5 of the disk image.

Figure 9:
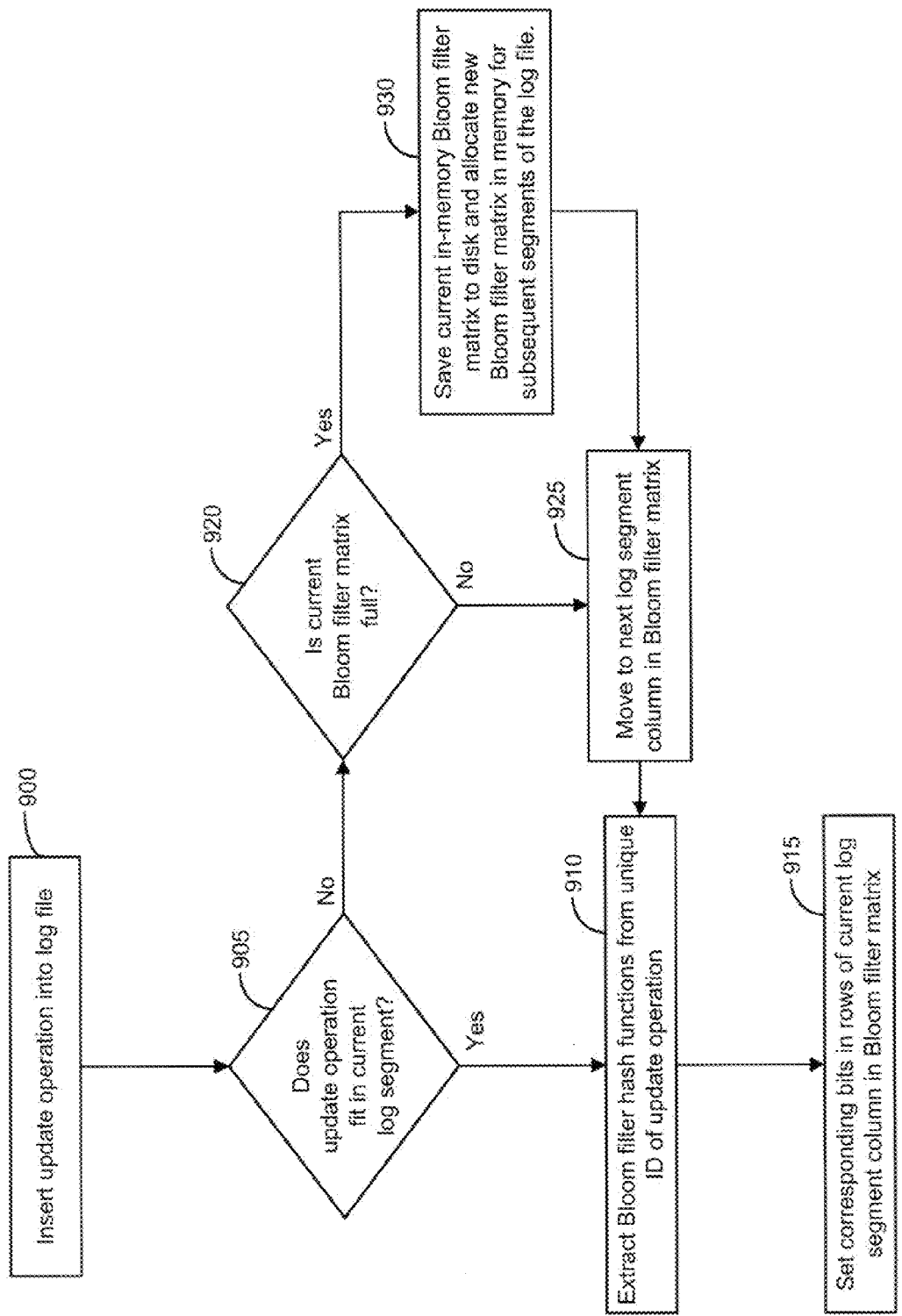
FIG. 9 depicts a flow chart for adding an update operation to a log segment of a disk image using a Bloom filter matrix data structure, according to one or more embodiments of the present invention.

FIG. 9 depicts a flow chart for adding an update operation to a log segment of a disk image using the Bloom filter matrix data structure, according to one or more embodiments of the present invention. While the following descriptions of the steps of the flow chart may reference structures of FIGS. 2, 3, 4A, and 4B, it should be recognized that any other network architectures, virtualization servers, disk image formats and update operation structures that are consistent with the teachings herein may be used in conjunction with the flow chart of FIG. 9. In step 900, virtual machine file system $220_A$ generates an update operation with, for example, a unique 160 bit id entry corresponding to a write operation issued by virtual machine $210_A$ and appends the update operation to the end of disk image 300. If, in step 905, virtual machine file system $220_A$ inserts the appended update operation within the current log segment, then in step 910, virtual machine file system $220_A$ generates ten hash values for the Bloom filter from the 160 bit id entry of the update operation by, for example, taking a contiguous 16 bit portion of the 160 bit id entry for each of the ten hash values, as described in FIG. 5. In step 915, virtual machine file system $220_A$ sets each bit position of the current log segment's Bloom filter (i.e., a column of the Bloom filter matrix data structure) corresponding to each of the ten hash values. If, however, in step 905, the appended update operation results in the start of a new log segment, then, in step 920, virtual machine file system $220_A$ assesses whether its Bloom filter matrix data structure is full (i.e., whether the last column of the Bloom filter matrix data structure represents the Bloom filter for the most recently filled log segment of the disk image). If, in step 920, virtual machine file system $220_A$ determines that its Bloom filter matrix data structure is not full, then in step 925, it moves to the next column (i.e., to the right) in the Bloom filter matrix data structure, which represents the Bloom filter for the next log segment in the disk image, prior to returning to step 910. If, however, in step 920, virtual machine file system $220_A$ determines that its Bloom filter matrix data structure is full, then in step 930, virtual machine file system $220_A$ stores the filled Bloom filter matrix data structure to local storage and allocates a new Bloom filter matrix data structure in memory for upcoming log segments in the disk image, prior to proceeding to step 925.

Figure 10:
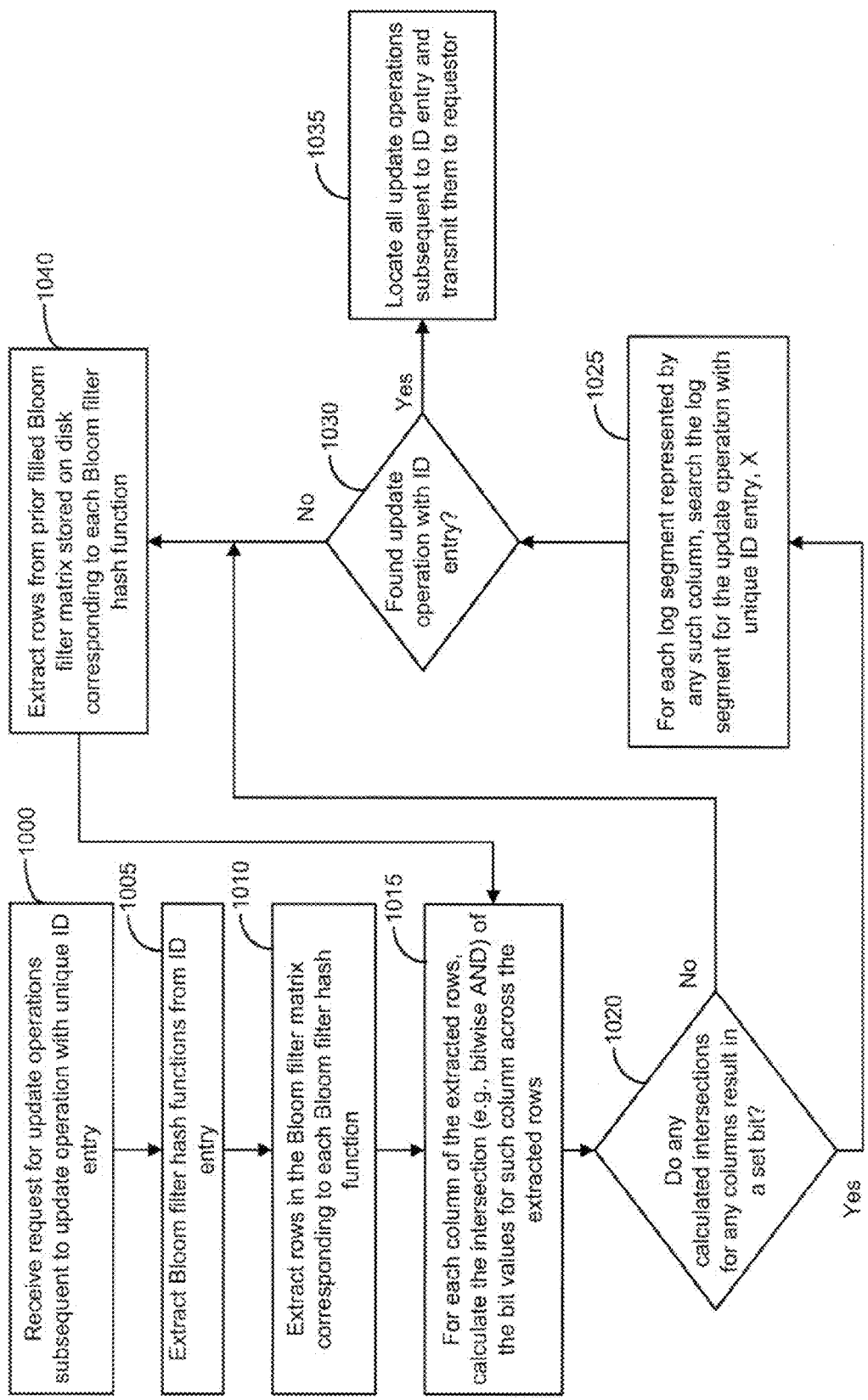
FIG. 10 depicts a flow chart for determining whether an update operation may be in a log segment of a disk image using a Bloom filter matrix data structure, according to one of more embodiments of the present invention.

FIG. 10 depicts a flow chart for determining whether an update operation may be in a log segment of a disk image using a Bloom filter matrix data structure, according to one of more embodiments of the present invention. While the following descriptions of the steps of the flow chart may reference structures of FIGS. 2, 3, 4A, and 4B, it should be recognized that any other network architectures, virtualization servers, disk image formats and update operation structures that are consistent with the teachings herein may be used in conjunction with the flow chart of FIG. 10. In step 1000, virtual machine file system $220_A$ receives a request from a secondary server for all update operations occurring since the last update operation stored in its secondary disk image, having a unique 160 bit id entry. In step 1005, virtual machine file system $220_A$ extracts the Bloom filter hash values from the received unique id entry (e.g., generating ten 16 bit portions from the 160 bit unique id entry, etc.). In step 1010, virtual machine file system $220_A$ extracts each of the rows in the Bloom filter matrix data structure corresponding to each of the extracted Bloom filter hash values. In step 1015, for each column of the extracted rows, virtual machine file system $220_A$ calculates the intersection (e.g., bitwise AND) of the bit values for such column across the extracted rows (i.e., with respect to the extracted rows, a bitwise AND of the bit values for all the columns across the Bloom filter matrix data structure is calculated). In step 1020, if any of the calculated intersections for any column results in a set bit, then in step 1025, for each log segment represented by such column, virtual machine file system $220_A$ searches for the update operation having the id entry in such log segment. If in step 1030, the update operation is found, then in step 1035, virtual machine file system $220_A$ extracts all update operations subsequent to the found update operation and transmits them to the secondary server. If, however, in step 1030, the update operation is not found in any of the log segments, then in step 1040, virtual machine file system $220_A$ access its local storage to extract those rows in its prior Bloom filter matrix data structure corresponding to each Bloom filter hash value prior to returning to step 1015.

Figure 11:
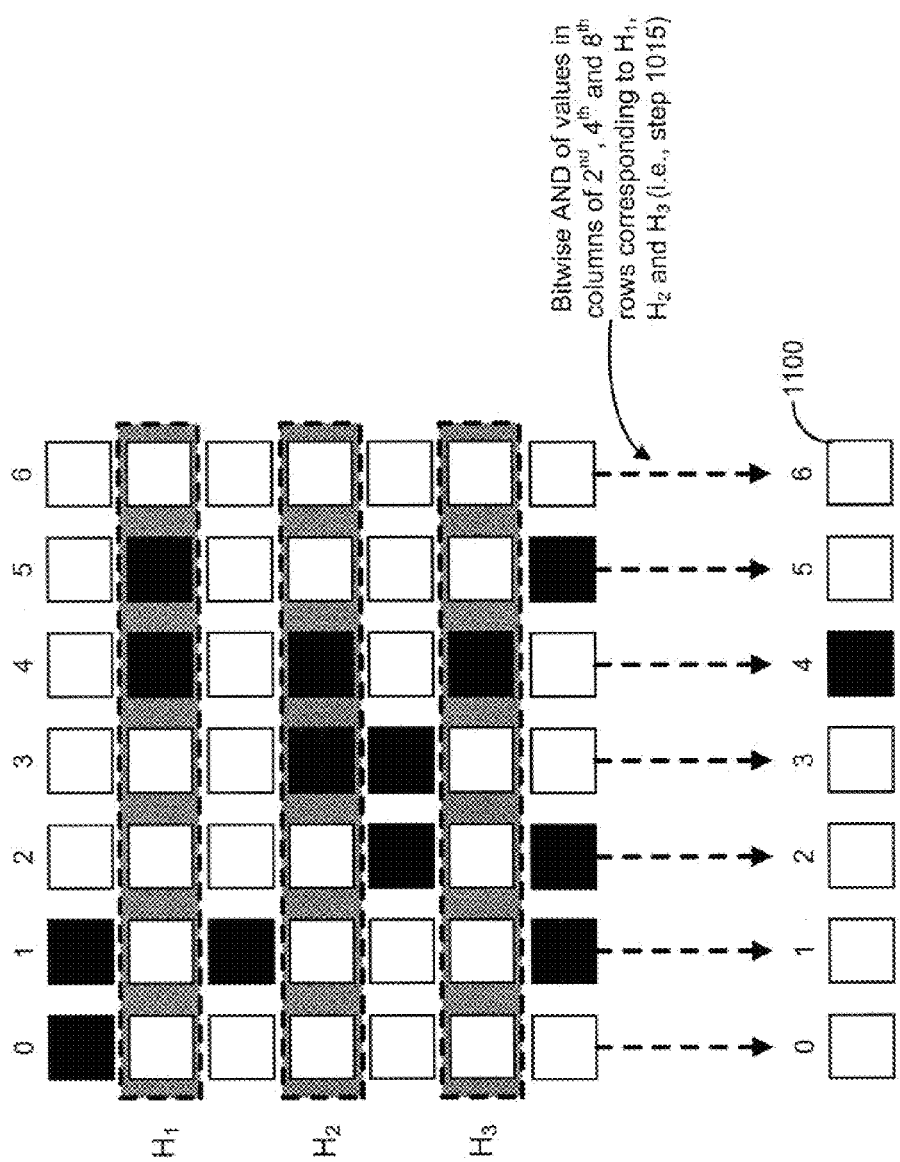
FIG. 11 depicts an illustration of the use of a Bloom filter matrix data structure according to the flow chart of FIG. 10.

FIG. 11 depicts an illustration of the use of a Bloom filter matrix data structure according to the flow chart of FIG. 10. For illustration purposes, the Bloom filter matrix data structure of FIG. 11 has been simplified to include only seven Bloom filters (e.g., columns) indexed by three hash values, $H_1$, $H_2$ and $H_3$ (rather then ten, as in previous examples). During step 1010 or step 1040 of FIG. 10, hash values $H_1$, $H_2$ and $H_3$ result in the extraction of the second, fourth and sixth rows in the Bloom filter matrix data structure of FIG. 11. If, for example, step 1040 is being performed, then each of these rows corresponds to a read request to the local storage. Row 1100 represents the intersection (i.e., bitwise AND) performed during step 1015 of FIG. 10 to determine whether any log segments represented by the Bloom filter matrix data structure may include the update operation relating to the hash values (i.e., update operations id entry derived the three hash values). As shown in FIG. 11, the resulting intersections indicate that log segment 4 (i.e., column 4) may contain the update operation with requested id entry. As such, in accordance with the flow chart of FIG. 10, log segment 4 would be searched for the particular update operation with the id entry in step 1025.

It should be recognized that various modifications and changes may be made to the specific embodiments described herein without departing from the broader spirit and scope of the invention as set forth in the appended claims. For example, although the foregoing embodiments have been described in the context of updating virtual machine disk images in a replicated and decentralized virtualization data center, it should be recognized that any system that needs to maintain a database indexed by large randomized keys that have no locality can utilize the techniques herein to minimize disk accesses in order to locate data corresponding to such random keys. For example, in addition to the use of the foregoing technique in the virtual machine file system context as described herein, any system that utilizes the indexing of individual elements in a stream of data by some hash value, where the hash output space exceeds the available core memory and where insertion speed cannot be dependent on the cost of disk access can benefit from the techniques disclosed herein. Similarly, while the foregoing embodiments discussed disk images of virtual machines with a log structure, it should be recognized that any system having any log files or objects (or files or object that may be structured as logs according to the teachings herein) may utilize the techniques disclosed herein. Furthermore, while the foregoing embodiments may have used specific measurements and sizes for exemplary purposes, such as 10 hash values, 160 bit id entries, $2^{16}$ bit array sizes for Bloom filters, and the like, it should be recognized that any of such sizes and measurements may vary in different embodiments consistent with the teachings herein.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Disc) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

I claim:

1. A method for locating a data record in a log file organized as a plurality of log segments, wherein each log segment comprises a plurality of data records and data records are indexed in the log file according to randomized unique ids, the method comprising:
   receiving a randomized unique id associated with the data record;
   generating a plurality of Bloom filter hash values from the randomized unique id;
   extracting a plurality of rows that correspond to the plurality of hash values from a two dimensional bit array, wherein each of the columns of the two dimensional bit array represents a Bloom filter corresponding to a log segment of the log file;
   calculating, for each of the columns in the two dimensional bit array, an intersection of the bit values in the column across the plurality of rows to determine if any column results in a set bit, wherein the set bit indicates that a log segment that corresponds to the column having a calculated intersection of the set bit to be searched for the data record associated with the randomized unique id;
   searching the log segment of the log file for the data record associated with the randomized unique id; and
   outputting the data record if the data record is found at the log segment.

2. The method of claim 1, wherein each of the plurality of Bloom filter hash values is generated by extracting a plurality of distinct bits from the randomized unique id.

3. The method of claim 1, wherein the log file is a virtual machine disk image and the data record is an update operation for the virtual machine disk image.

4. The method of claim 3, wherein the two dimensional bit array is stored in a memory of a server running a virtual machine file system maintaining the virtual machine disk image.

5. The method of claim 4, further comprising the step of accessing a data store of the server to read a second plurality of rows that correspond to the plurality of hash values from a second two dimensional bit array stored in the data store, wherein each of the columns of the second two dimensional bit array represents a Bloom filter corresponding to a log segment of the log file.

6. The method of claim 5, further comprising the steps of:
   calculating, for each of the columns in the second two dimensional bit array, an intersection of the bit values in such column across the second plurality of rows; and
   searching a log segment of the log file for the data record associated with the randomized unique id, wherein the log segment corresponds to a column in the second two dimensional bit array having a calculated intersection of a set bit.

7. The method of claim 5, wherein the accessing step is performed when the calculating step results in no calculated intersections having a set bit.

8. The method of claim 5, wherein the accessing step is performed when the searching step does not result in a finding of the data record.

9. The method of claim 1, further comprising the steps of:
   receiving a second data record associated with a second randomized unique id;
   generating a second plurality of Bloom filter hash values from the second randomized unique id; and
   setting bit values in a current column of the two dimensional bit array, wherein the set bit values are for a plurality of rows that correspond to the generated second plurality of Bloom filter hash values.

10. A non-transitory computer-readable storage medium including instructions that, when executed by a processing unit of a computer system maintaining a log file organized as a plurality of log segments, wherein each log segment comprises a plurality of data records and data records are indexed in the log file according to randomized unique ids, causes the processing unit to locate a data record in the log file, by performing the steps of:

receiving a randomized unique id associated with the data record; generating a plurality of Bloom filter hash values from the randomized unique id;

extracting a plurality of rows that correspond to the plurality of hash values from a two dimensional bit array, wherein each of the columns of the two dimensional bit array represents a Bloom filter corresponding to a log segment of the log file;

calculating, for each of the columns in the two dimensional bit array, an intersection of the bit values in the column across the plurality of rows to determine if any column results in a set bit, wherein the set bit indicates that a log segment that corresponds to the column having a calculated intersection of the set bit to be searched for the data record associated with the randomized unique id;

searching the log segment of the log file for the data record associated with the randomized unique id; and outputting the data record if the data record is found at the log segment.

11. The non-transitory computer readable storage medium of claim 10, wherein each of the plurality of Bloom filter hash values is generated by extracting a plurality of distinct bits from the randomized unique id.

12. The non-transitory computer readable storage medium of claim 10, wherein the log file is a virtual machine disk image and the data record is an update operation for the virtual machine disk image.

13. The non-transitory computer readable storage medium of claim 12, wherein the two dimensional bit array is stored in a memory of a server running a virtual machine file system maintaining the virtual machine disk image.

14. The non-transitory computer readable storage medium of claim 13, wherein the processing unit further performs the step of accessing a data store of the server to read a second plurality of rows that correspond to the plurality of hash values from a second two dimensional bit array stored in the data store, wherein each of the columns of the second two dimensional bit array represents a Bloom filter corresponding to a log segment of the log file.

15. The non-transitory computer readable storage medium of claim 14, wherein the processing unit further performs the steps of:

calculating, for each of the columns in the second two dimensional bit array, an intersection of the bit values in such column across the second plurality of rows; and searching a log segment of the log file for the data record associated with the randomized unique id, wherein the log segment corresponds to a column in the second two dimensional bit array having a calculated intersection of a set bit.

16. The non-transitory computer readable storage medium of claim 14, wherein the accessing step is performed when the calculating step results in no calculated intersections having a set bit.

17. The non-transitory computer readable storage medium of claim 14, wherein the accessing step is performed when the searching step does not result in a finding of the data record.

18. The non-transitory computer readable storage medium of claim 10, wherein the processing unit further performs the steps of:

receiving a second data record associated with a second randomized unique id;

generating a second plurality of Bloom filter hash values from the second randomized unique id; and setting bit values in a current column of the two dimensional bit array, wherein the set bit values are for a plurality of rows that correspond to the generated second plurality of Bloom filter hash values.

* * * * *